United States Patent
Horvat et al.

(10) Patent No.: US 7,036,018 B2
(45) Date of Patent: Apr. 25, 2006

(54) INTEGRATED SECURITY CIRCUIT

(75) Inventors: Helmut Horvat, Graz (AT); Stefan Wallstab, München (DE)

(73) Assignee: Infineon Technologies AG, Munich (DE)

(*) Notice: Subject to any disclaimer, the term of this patent is extended or adjusted under 35 U.S.C. 154(b) by 298 days.

(21) Appl. No.: 10/199,614

(22) Filed: Jul. 19, 2002

(65) Prior Publication Data

US 2003/0005315 A1 Jan. 2, 2003

Related U.S. Application Data

(63) Continuation of application No. PCT/EP00/13136, filed on Dec. 22, 2000.

(30) Foreign Application Priority Data

Jan. 19, 2000  (EP) .................... 00100995

(51) Int. Cl.
  G06F 11/30  (2006.01)
  G06F 12/14  (2006.01)
  H04L 9/32   (2006.01)

(52) U.S. Cl. ............... 713/189; 713/172; 713/194; 713/502; 713/600; 320/166; 326/35

(58) Field of Classification Search ........... 713/189, 713/172
See application file for complete search history.

(56) References Cited

U.S. PATENT DOCUMENTS

| 5,533,123 | A  | * | 7/1996  | Force et al. ............ 713/189 |
| 5,594,227 | A  |   | 1/1997  | Deo |
| 6,118,490 | A  | * | 9/2000  | Moore et al. ........... 348/473 |
| 6,140,863 | A  | * | 10/2000 | Fujisawa .............. 327/540 |
| 6,782,479 | B1 | * | 8/2004  | Williams et al. ....... 713/194 |

FOREIGN PATENT DOCUMENTS

| FR | 2 311 360   | 12/1976 |
| FR | 2 493 564   | 5/1982  |
| WO | WO 88/10479 | 12/1988 |
| WO | WO 99/56253 | 11/1999 |

* cited by examiner

*Primary Examiner*—Gilberto Barron
*Assistant Examiner*—Samson B Lemma
(74) *Attorney, Agent, or Firm*—Laurence A. Greenberg; Werner H. Stemer; Ralph E. Locher

(57) ABSTRACT

An integrated security circuit, for example, a microcontroller for smart cards, includes a function unit executing a security function. A control device determines the number of executions of the security function per unit of time. The continued execution of the security function is blocked when a threshold value is exceeded. For such a purpose, an analog timekeeper incorporating a charge storage device is preferably provided that measures the elapsing time even with the supply potential disconnected. A usage counter is updated whenever the security function is called. The security circuit offers increased protection against statistical attacks. The complexity involved in the implementation is justifiably low. The security circuit is compatible with the existing system.

14 Claims, 2 Drawing Sheets

INTEGRATED SECURITY CIRCUIT

CROSS-REFERENCE TO RELATED APPLICATION

This application is a continuation of copending International Application No. PCT/EP00/13136, filed Dec. 22, 2000, which designated the United States and was not published in English.

BACKGROUND OF THE INVENTION

Field of the Invention

The invention relates to an integrated security circuit having a function unit for executing a security function.

Integrated security circuits are used, for example, in smart cards. The circuit is integrated monolithically in a microcontroller, and computes, for example, the encoding and decoding of the data traffic between the microcontroller and a reader. The security-sensitive functions of the microcontroller on the smart card are exposed to unauthorized, fraudulent attacks aimed at decoding the data. A prior art method of attack involves repeatedly using security-sensitive functions of interest on the microcontroller with data sorted according to suitable criteria. Special statistical techniques and correlation measures are applied to the measurements so obtained to gain information that enables the data traffic to and from the smart card to be decoded. To determine a cryptographic key, it may be necessary to activate the smart card some 10,000 times, and to determine each time whether the microcontroller accepts the access as authorized or rejects it as unauthorized. Microcontrollers in the prior art permit any number of such attack attempts in practice. After several hours or days of attempts, the cryptographic key might then be reconstructed.

Existing methods of warding off statistical attacks focus, for example, on corrupting the measurements by superimposing interference signals or shifting the wanted signal in time so that statistical analyses are made more difficult. An effective configuration slows down the processing speed in the useful application, but low complexity of signal corruption might not provide sufficient protection.

Another option in the prior art involves updating the key used after a certain number of usages, for example, by adjusting the key by a one-way function such as a hash function or by the N-count technique. One disadvantage of these measures is that not only does the smart-card microcontroller need to be redesigned accordingly, but also the whole security system including all the smart cards already issued and the readers.

SUMMARY OF THE INVENTION

It is accordingly an object of the invention to provide an integrated security circuit that overcomes the hereinaforementioned disadvantages of the heretofore-known devices of this general type and that has a high level of security against unauthorized attacks.

With the foregoing and other objects in view, there is provided, in accordance with the invention, an integrated security circuit, including a function unit adapted to execute a security function, and a control device connected to the function unit and adapted to determine a number of executions of the security function per unit of time and, the control device enabling and blocking a continued execution of the security function dependent upon the determination, the control device having a counting device connected to the function unit and counting each execution of the security function after an initialization, a capacitor, in dependence on whose charge state an expiry signal can be generated indicating that a defined maximum time period has expired, and a switch connected to the counting device and to the capacitor, the switch recharging the capacitor and initializing the counting device when the expiry signal is present. The switch can be a switching means and the capacitor can be a charge storage device.

In the security circuit according to the invention, the number of usages per unit of time is employed as the criterion for blocking the security function. By a suitable configuration of the parameters, the time required to determine a sufficient amount of measurement data can be made discouragingly long for an attacker. The additional measures cause a negligible increase in the computing load on the microcontroller. There is, thus, no increase in the necessary processing speed. Additional circuit measures are required, but the circuit complexity is low. The interface to the whole system does not change so that the security circuit according to the invention is compatible with the relevant existing circuits.

The configuration of the control device determining the number of executions of the security function per unit of time includes two counting devices. One of the counters, the usage counter, is incremented (incremental counter), or alternatively decremented (decremental counter), whenever the safety function is called. A timing device measures the elapsing absolute time. When the circuit is initialized, the timing device is charged and the counting device set to a defined value. If the counting device reaches a threshold value without the timing device having run down, execution of the security function is blocked. The overall outcome is that the number of executions of the security function per unit of time is measured, and the execution of the security function is blocked if a defined number is exceeded.

The timing device is advantageously configured to operate even with the supply voltage disconnected. When the timing device has run down, either with or without the supply voltage connected, an expiry signal is output so that the timing device and the usage counter can be recharged. The block on the security function is removed once the usage counter has been reset. Alternatively it is also possible that, when the threshold value is exceeded by the usage counter, the security circuit is permanently blocked, and, hence, made unusable.

Because the timing device continues to run even while the supply voltage is disconnected, it is not possible to get the time on the clock to expire more quickly by switching the supply voltage off and on rapidly, and, hence, to achieve a greater number of measurements in one attack. The timing device can have an analog or digital construction. An analog timing device uses a charge storage device, which is discharged after being charged up, the discharge process continuing even after the supply voltage is disconnected. A digital timing device can be implemented as an incremental or decremental counter in which an energy store, for example, a battery, maintains the power supply specifically for the counter. The remaining circuits of the microcontroller are not supplied with power.

The analog configuration of the timing device includes a capacitor that is charged at initialization and subsequently only discharged through leakage-current losses. In the capacitor configuration it is advantageous to enclose one of the poles of the capacitor—except for the contact surface in dielectric. The dielectric may be silicon dioxide or silicon nitride. The pole is then sufficiently well insulated for almost no leakage currents to flow away from the plate surface itself. The capacitor is controlled by a switching transistor in MOS semiconductor technology. When the switching transistor is in the on state, the capacitor is charged; when the switching transistor is in the off state, the capacitor discharges only through leakage currents flowing away through that electrode region connected to the capacitor pole in question. By applying a drive to the substrate contact of the switching transistor, its behavior in the on and off state can be further improved. The voltage across the capacitor is interrogated through a comparator to determine the discharged state and to activate the expiry signal.

The discharge curve for the capacitor is temperature dependent. The capacitor discharges more quickly at a higher temperature than at a lower temperature. The security function can only be executed at typical operating temperatures, however, to obtain appropriate measurements for a statistical attack. The time required for heating up and cooling down prevents sufficient numbers of measurements being generated in a reasonable time. A time basis that is based on the discharge of traps at nitrite layers through Fowler-Nordheim tunneling is not dependent on temperature and is suitable as an alternative storage medium to a capacitor.

There are various implementation options for the usage counter. The usage counter can be implemented purely in software, where the count value is incremented or decremented respectively and analyzed only by the central processing unit (CPU) of the microcontroller. After each update, the count value is advantageously written back to the non-volatile memory (NVM) included anyway on the microcontroller chip so that it is retained even after a loss of voltage. Mixed configurations of hardware and software are also possible, in particular, where it is intended to monitor the usage of a coprocessor. The CPU reads the current value of the usage counter from the NVM, and writes it as a start value to a hardware counter. In addition, the hardware counter is loaded with the threshold value, the blocking signal being generated when the threshold value is reached. The final value can also be held in a ROM memory, however. If the threshold value is reached, the hardware counter stops and blocks the coprocessor. The threshold value can also be written to the NVM as a precaution to retain the information even if the supply voltage is disconnected. Once the coprocessor operation is finished, the actual counter status is written to the NVM. Alternatively, the hardware counter could also access the NVM directly.

The usage counter can also be implemented as an analog circuit. The counter status is then represented by the amount of charge in a charge storage device, thus, achieving independence from an operating clock. If both the operations counter and the timekeeper are implemented as analog circuits, then the information representing the number of usages per unit of time is given by the ratio of the voltage conditions of the two charge storage devices. The charge storage devices for the timekeeper and usage counter are initially charged to different voltages. Each time the security function is called, a brief, incomplete charge equalization process is performed. When a certain voltage ratio is attained, for example, when both voltages are equal, then this determines that the maximum permissible number of usages of the security function per unit of time has been reached. A further call of the security function is then blocked.

In accordance with another feature of the invention, there is provided means for defining a threshold value, the defining means connected to the function unit, and the function unit adapted to block an execution of the security function when the counting device exceeds the threshold value and, otherwise, enable the execution of the security function.

In accordance with a further feature of the invention, there is provided a threshold value generator connected to the function unit and generating a threshold value, and the function unit adapted to block an execution of the security function when the counting device exceeds the threshold value and, otherwise, enable the execution of the security function.

In accordance with an added feature of the invention, there are provided contacts for a supply voltage, the contacts connected to the function unit and the control device, the function unit being adapted to execute the security function when the supply voltage is present, and the capacitor being adapted to measure an elapsing time both when the supply voltage is present and when the supply voltage is subsequently not present.

In accordance with an additional feature of the invention, the counting device is one of a digital incremental counter and a decremental counter respectively incremented and decremented whenever the security function is called, the counter is preset, at the initialization, to a value selected from the group consisting of zero and the threshold value, and the counter is adapted to generate a signal to one of enable and block continued execution of the security function when the value is exceeded.

In accordance with yet another feature of the invention, the capacitor can only be discharged through a leakage-current loss.

In accordance with yet a further feature of the invention, there is provided a MOS switching transistor having a gate electrode and a substrate contact, an additional MOS switching transistor, and contacts for a supply voltage, the contacts connected to the function unit and the control device. The MOS switching transistor and the capacitor form a series circuit connected between the contacts. The gate electrode is to be controlled by a signal specifying the initialization. The substrate contact is selectively connected to one of the contacts through the additional MOS switching transistor.

In accordance with yet an added feature of the invention, there is provided a first contact for a reference signal, a comparator having an input side and an output side with a second contact, the input side connected to the one of the two poles enclosed by the dielectric and to the first contact, and the second contact supplies the expiry signal.

In accordance with a concomitant feature of the invention, the security function is selected from one of the group consisting of an encoding of data and a decoding of data.

Other features that are considered as characteristic for the invention are set forth in the appended claims.

Although the invention is illustrated and described herein as embodied in an integrated security circuit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
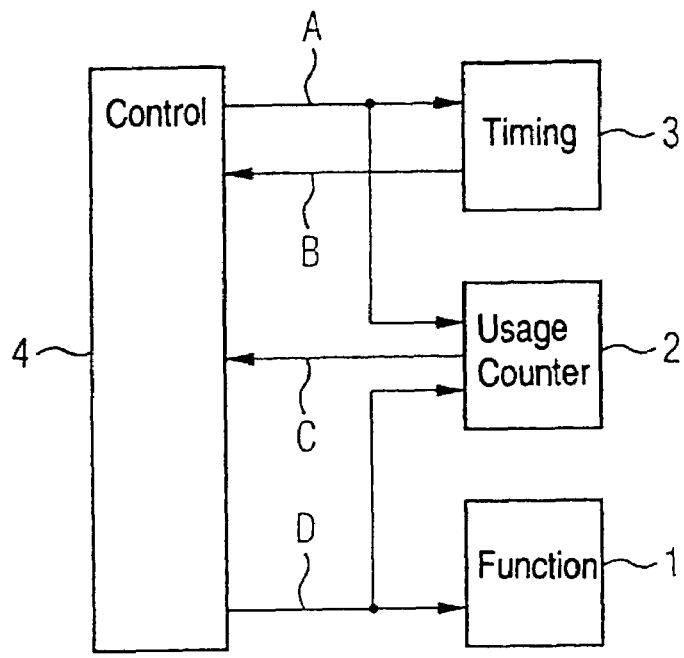
FIG. 1 is a block circuit diagram of an integrated security circuit according to the invention.

Referring now to the figures of the drawings in detail and first, particularly to FIG. 1 thereof, there is shown a timing device or timekeeper 3, a usage counter 2, and a function device 1 that executes a security function. A control device 4 is employed for controlling the process. The circuit is contained in a microcontroller that is disposed on a smart card. The function unit 1 encodes and decodes the data traffic between smart card and reader.

Figure 3:
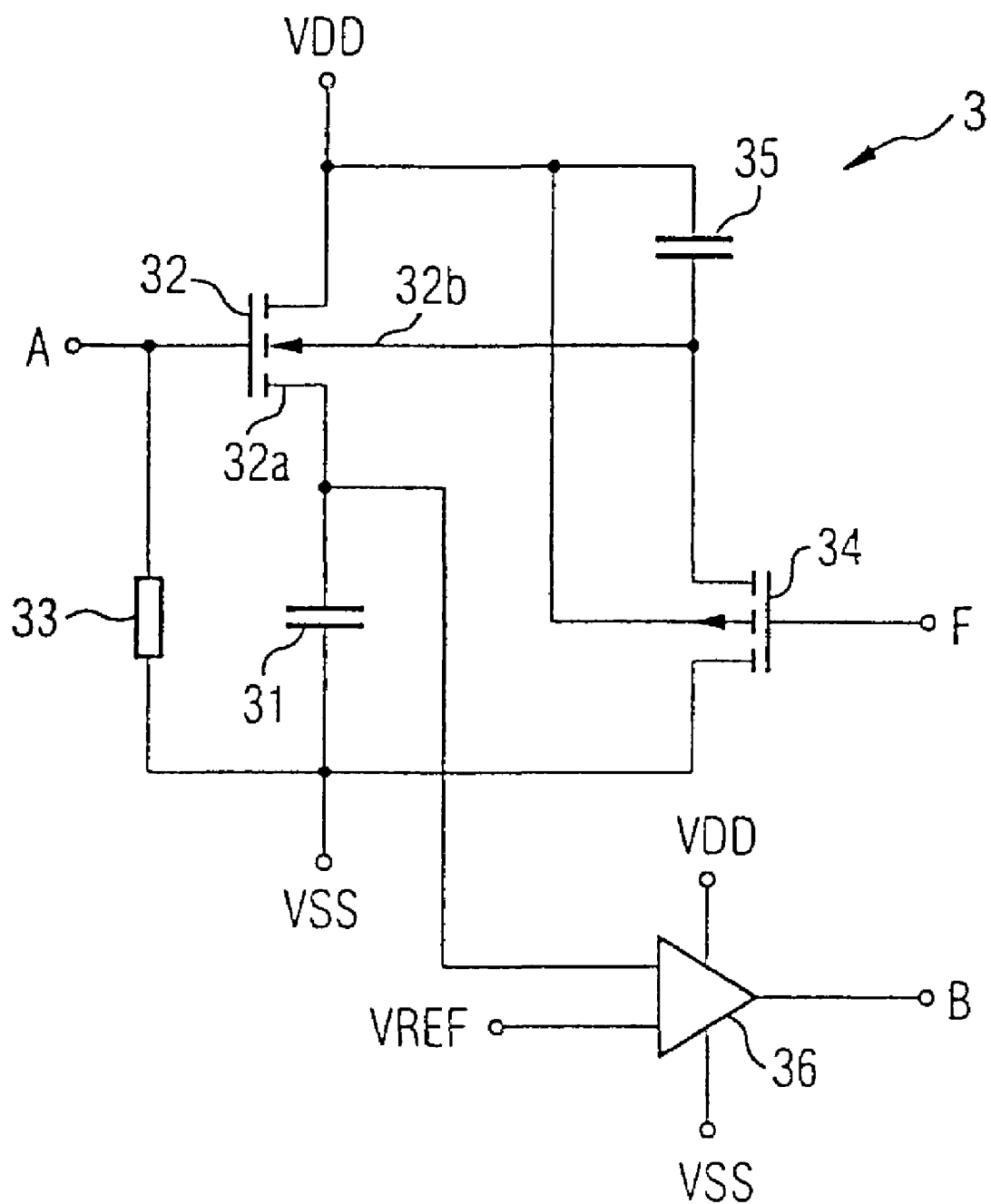
FIG. 3 is an analog schematic circuit diagram of a timing device suitable for the security circuit according to the invention.

To prevent statistical attacks for possible determination of the function characteristic or even the key of the device 1, there is a provision to limit the number of usages of the function unit 1 per unit of time. To do so, the timekeeper 3 is charged by a control signal A from the control device 4 so that it can subsequently run down. An expiry signal B, which is returned from the timekeeper 3 to the control device 4, indicates that the absolute time measured by the timekeeper 3 has elapsed. The timekeeper 3 can be configured as a digital counter or analog counting device. An example of an analog configuration is shown in FIG. 3.

The usage counter 2 is a digital counter, which is also initialized, i.e., set to a defined value, when the timekeeper 3 is charged. The usage counter 2 is incremented every time the function unit 1 is called by the signal D. If the counter 2 reaches a defined maximum value, the signal C is activated. If the maximum value of the counter 2 is reached without the timekeeper 3 having yet run down, the control device 4 concludes that a defined number of calls of the safety function in the unit 1 over a time period determined by the timekeeper 3 has been reached. The control unit 4 thereupon blocks every further call of the safety function in the function unit 1. In the example described, the usage counter 2 is an incremental counter. Alternatively, it can also be configured as a decremental counter that is set to a start value at initialization and then decremented down to a final value, for example, the counter status zero.

The timekeeper 3 is configured such that it continues to run and measure the elapsing absolute time even with the supply voltage disconnected. The usage counter 2 also saves the instantaneous usage count value after the supply voltage is disconnected. Saving is accomplished by storing the instantaneous counter status of the counter 2 temporarily in a non-volatile memory that is present anyway on the microcontroller. Alternatively, a battery backup is possible.

The assessment of whether or not the timekeeper has run down can be made adjustable to achieve flexibility with regard to both the usage parameter and the time-period parameter. For some purposes, affording five usages every five minutes can be sufficient, while for other purposes it may make sense to perform the measurement over a longer time period, e.g., 60 usages per hour. It is then quite possible for these 60 usages to take place in the first five minutes of the hour.

Figure 2:
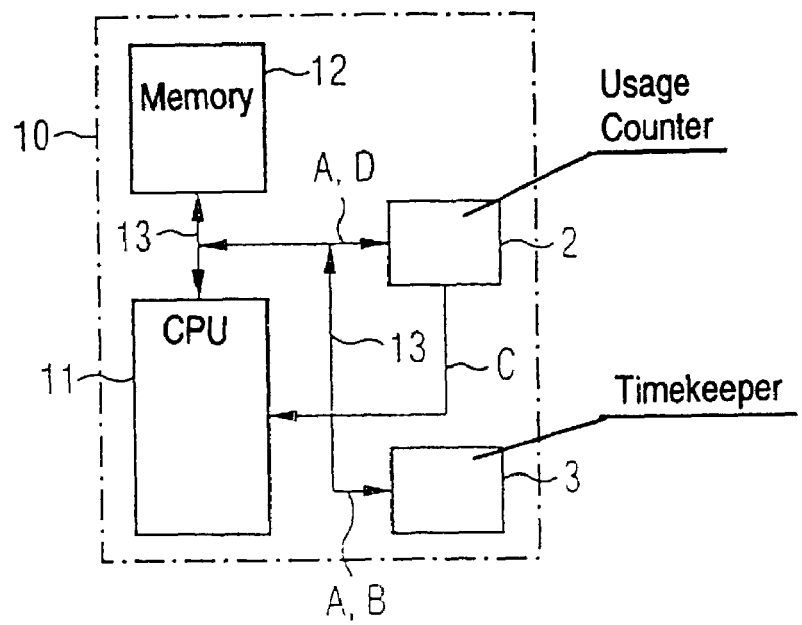
FIG. 2 is a block circuit diagram of a circuit according to the invention containing elements of a microcontroller relevant to the invention.

The microcontroller 10 in FIG. 2 contains a central processing unit CPU 11, which controls the operating processes and performs calculations. Data can be permanently stored in a non-volatile memory NVM 12 even after disconnecting the supply voltage. CPU 11 and NVM 12 communicate through a chip-internal bus 13. The timekeeper 3 is provided as a separate circuit block. The signals A, B controlling the timekeeper 3 are provided through the bus 13. The usage counter 2 is disposed on the chip of the microcontroller 10 as an additional separate circuit block. It is supplied with the signals A and D through the bus 13. The function unit 1 is implemented by the CPU 11 and suitable software control. When the counter 2 reaches the predefined final value, the status is signaled to the CPU 11 as control signal C. The usage counter 2 receives the start value and final value from the NVM 12. After each update of the counter status of the counter 2, this is written back to the NVM 12 so that it is still available even after reconnecting the supply voltage after the supply voltage is disconnected, if the timekeeper 3 has not yet run down.

The timekeeper 3 is advantageously configured as an analog counter. An exemplary embodiment is shown in FIG. 3. The timekeeper includes a charge storage device 31 whose charge state represents the elapsed time. The charge storage device 31 is a capacitor. A switching transistor 32 and the capacitor 31 form a series circuit connected between supply voltage contacts for the supply potentials VDD and VSS. The switching transistor 32 is implemented in MOS circuit technology as an N-channel transistor and is used for charging and discharging the capacitor 31. To charge the timekeeper, i.e., to charge the capacitor 31, the signal A at the gate contact of the switching transistor 32 is activated so that the N-channel MOS transistor 32 is in the on state. The capacitor 31 is charged from the supply potential VDD. A resistor 33 connected between the gate contact of the transistor 32 and the contact to ground VSS is used to ensure that the transistor 32 switches off when the signal A is deactivated.

To minimize leakage-current losses at the capacitor 31, one of its poles, for instance, the pole connected to the transistor 32, is enclosed completely in silicon oxide or nitride, except for the connecting lead between capacitor plate and transistor 32. Silicon oxide and nitride also form the dielectric of the capacitor 31. The configuration can be realized by combining a metal layer and the gate polysilicon into a pole. The first pole is connected to the transistor 32. A metal2-layer, substrate and poly2-layer form the second pole connected to ground VSS. Metal1- and metal2-layers are two metallizations lying one on top of the other in this case.

When the switching transistor 32 is in the off state, the charge is stored in the capacitor 31 and is only released through leakage-current paths that are set up in the semiconductor substrate. The charge is retained in the capacitor 31 even after disconnecting the supply voltage VDD, VSS. Insulating the pole of the capacitor 31 connected to the switching transistor prevents leakage-current losses from the pole directly into the substrate. Thus, the capacitor 31 can only be discharged through the doping structure of the capacitor-side contact 32a of the switching transistor 32. The N-channel MOS transistor 32 is fabricated in a P-type well. Low leakage currents are set up here, developing in the path between the doping region that forms the contact 32a of the transistor 32, the well, and the substrate. The discharge path is of a sufficiently high resistance to enable a suitably long time period to be measured by the timekeeper. On the other hand, however, the discharge ends at a reasonable time. The discharge rate lies in the order of magnitude of 1 fA/µm² at room temperature. The discharge rate can be scaled by suitable geometric adjustment of the doping structures. The doping region of the contact 32a is advantageously fabricated as a circular region starting from the substrate surface to achieve a minimum contact area with the P-type well. When the supply voltage VDD, VSS is present, the contact 32a acts as source contact of the transistor 32; when the supply voltage is disconnected, the voltage conditions reverse so that the contact 32a acts as gate electrode. The voltage lying across the capacitor 31 is interrogated by a comparator 36. The comparator 36 is enabled when the supply voltage VDD, VSS is present. It compares the voltage across the capacitor 31 with a reference voltage VREF and, if the capacitor voltage 31 has fallen below the reference voltage VREF, it generates the disable signal B, thereby indicating that the time period to be measured has expired.

The substrate contact 32b of the switching transistor 32 can be connected to ground VSS through a P-channel MOS transistor 34. The P-channel MOS transistor 34 is controlled by a signal F so as to drive it into the on state after the switching transistor 32 is switched off so that the substrate contact 32b of the switching transistor 32 is taken to ground VSS. The configuration has the effect of further reducing any sub-threshold currents flowing through the channel of the transistor 32. When, conversely, the switching transistor 32 is switched to the on state to charge the capacitor 31, the transistor 34 is switched off so that the substrate contact 32b of the switching transistor 32 is pulled through a capacitor 35 to the positive supply voltage VDD to drive the conducting channel of the switching transistor 32 further into the on state.

As an alternative to the switched substrate contact 32b of the switching transistor 32 shown in FIG. 3, a negative bias can be applied to the gate of the transistor 32 through a switched capacitor, i.e., the gate is set to a potential below ground VSS. This is done to turn the transistor 32 even further into the off region and so avoid sub-threshold currents through its channel.

We claim:

1. An integrated security circuit, comprising:
    a function unit adapted to execute a security function; and
    a control device connected to said function unit and adapted to determine a number of executions of said security function per unit of time and, said control device enabling and blocking a continued execution of said security function dependent upon said determination, said control device having:
        a counting device connected to said function unit and counting each execution of said security function after an initialization;
        a capacitor, in dependence on whose charge state an expiry signal can be generated indicating that a defined maximum time period has expired, said defined maximum time period being derived from a discharging process of said capacitor; and
        a switch connected to said counting device and to said capacitor, said switch recharging said capacitor and initializing said counting device when said expiry signal is present.

2. The integrated security circuit according to claim 1, including:
    a means for defining a threshold value, said defining means connected to said function unit; and
    said function unit adapted to block an execution of said security function when said counting device exceeds said threshold value and, otherwise, enable the execution of said security function.

3. The integrated security circuit according to claim 1, including:
    a threshold value generator connected to said function unit and generating a threshold value; and
    said function unit adapted to block an execution of said security function when said counting device exceeds said threshold value and, otherwise, enable the execution of said security function.

4. The integrated security circuit according to claim 2, including contacts for a supply voltage, said contacts connected to said function unit and said control device, said function unit being adapted to execute said security function when the supply voltage is present, and said capacitor being adapted to measure an elapsing time both when the supply voltage is present and when the supply voltage is subsequently not present.

5. The integrated security circuit according to claim 2, wherein:
    said counting device is one of a digital incremental counter and a decremental counter respectively incremented and decremented whenever said security function is called;
    said counter is preset, at said initialization, to a value selected from the group consisting of zero and said threshold value; and
    said counter is adapted to generate a signal to one of enable and block continued execution of said security function when said value is exceeded.

6. The integrated security circuit according to claim 1, wherein said capacitor can only be discharged through a leakage-current loss.

7. The integrated security circuit according to claim 1, wherein said capacitor is only discharged through a leakage-current loss.

8. The integrated security circuit according to claim 6, wherein:
    said capacitor has two poles and an interlying dielectric; and
    one of said two poles is enclosed by said dielectric.

9. The integrated security circuit according to claim 6, including:
    a MOS switching transistor having a gate electrode and a substrate contact;
    an additional MOS switching transistor;
    contacts for a supply voltage, said contacts connected to said function unit and said control device;
    said MOS switching transistor and said capacitor forming a series circuit connected between said contacts;
    said gate electrode is to be controlled by a signal specifying said initialization; and
    said substrate contact is selectively connected to one of said contacts through said additional MOS switching transistor.

10. The integrated security circuit according to claim 8, including:
    a MOS switching transistor having a gate electrode and a substrate contact;
    an additional MOS switching transistor;
    contacts for a supply voltage, said contacts connected to said function unit and said control device;
    said MOS switching transistor and said capacitor forming a series circuit connected between said contacts;
    said gate electrode is to be controlled by a signal specifying said initialization; and said substrate contact is selectively connected to one of said contacts through said additional MOS switching transistor.

11. The integrated security circuit according to claim 8, including:
a first contact for a reference signal;
a comparator having:
an input side; and
an output side with a second contact;
said input side connected to said one of said two poles enclosed by said dielectric and to said first contact; and
said second contact supplies said expiry signal.

12. The integrated security circuit according to claim 1, wherein said security function is selected from one of the group consisting of an encoding of data and a decoding of data.

13. An integrated security circuit, comprising:
a function unit adapted to execute a security function; and
a control device connected to said function unit and adapted to determine a number of executions of said security function per unit of time and, said control device enabling and blocking a continued execution of said security function dependent upon said determination, said control device having:
a counting device connected to said function unit and counting each execution of said security function after an initialization;
a charge storage device, in dependence on whose charge state an expiry signal can be generated indicating that a defined maximum time period has expired, said defined maximum time period being derived from a discharging process of said charge storage device; and
a switch connected to said counting device and to said charge storage device, said switch recharging said charge storage device and initializing said counting device when said expiry signal is present.

14. An integrated security circuit, comprising:
a function unit adapted to execute a security function; and
a control device connected to said function unit and adapted to determine a number of executions of said security function per unit of time and, said control device enabling and blocking a continued execution of said security function dependent upon said determination, said control device having:
a counting device connected to said function unit and counting each execution of said security function after an initialization;
a capacitor, in dependence on whose charge state an expiry signal can be generated indicating that a defined maximum time period has expired, said defined maximum time period being derived from a discharging process of said capacitor; and
a switching means connected to said counting device and to said capacitor, said switching means recharging said capacitor and initializing said counting device when said expiry signal is present.

* * * * *